Sept. 3, 1968 J. O. KUHN ET AL 3,399,944
TOY MOVIE PROJECTOR
Filed Sept. 29, 1965 4 Sheets-Sheet 1

INVENTORS
James O. Kuhn
Karl B. Rave
BY
Wood, Herron & Evans
ATTORNEYS

INVENTORS
James O. Kuhn
Karl B. Rave
BY
Wood, Herron & Evans
ATTORNEYS

Sept. 3, 1968  J. O. KUHN ET AL  3,399,944
TOY MOVIE PROJECTOR
Filed Sept. 29, 1965  4 Sheets-Sheet 4
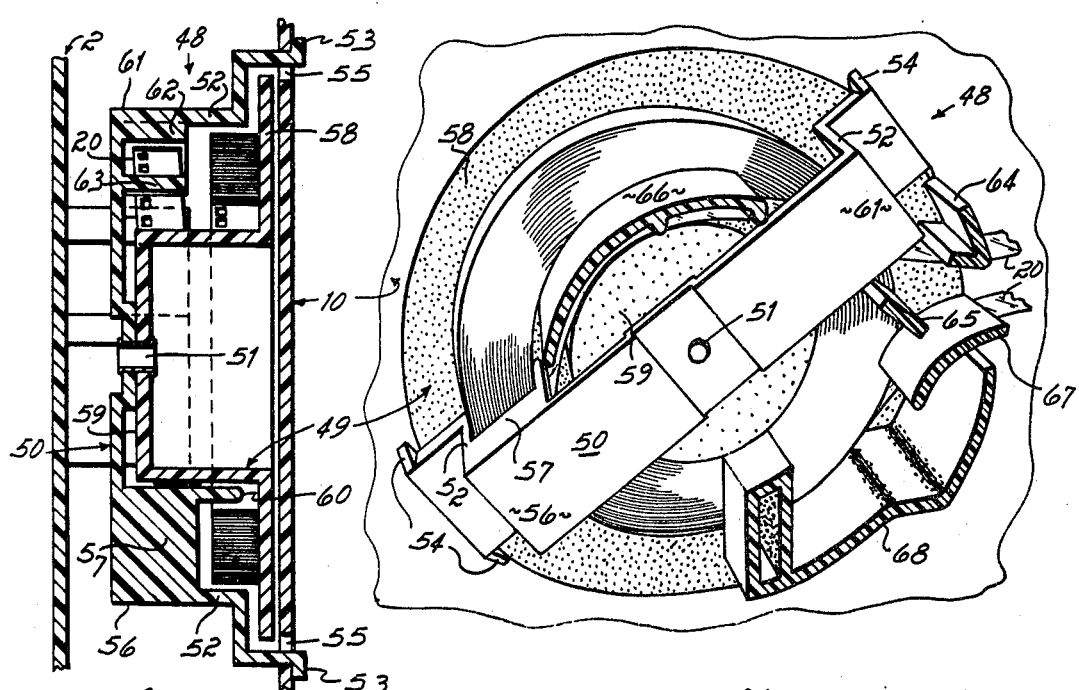
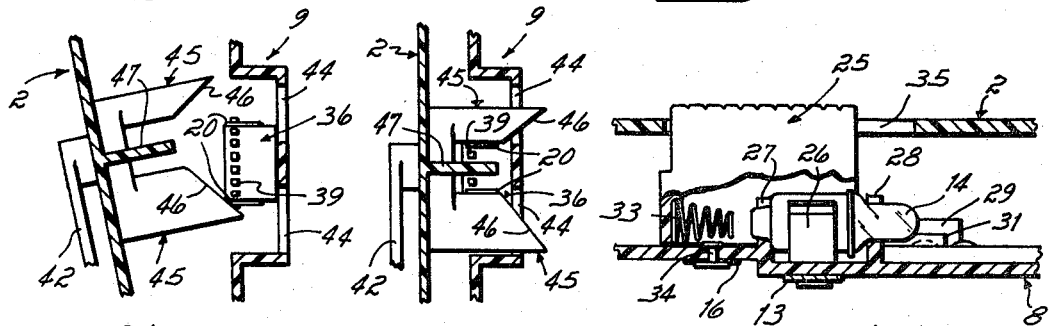
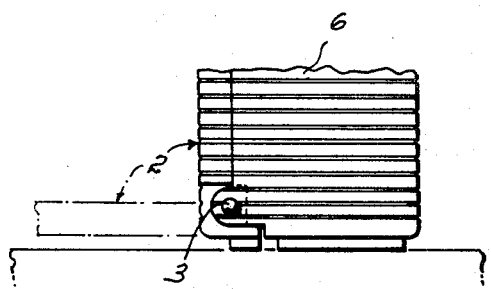
INVENTORS
James O. Kuhn
Karl B. Rave
BY
Wood, Herron & Evans
ATTORNEYS

3,399,944
TOY MOVIE PROJECTOR
James O. Kuhn and Karl B. Rave, Cincinnati, Ohio, assignors to Kenner Products Company, Cincinnati, Ohio, a corporation of Ohio
Filed Sept. 29, 1965, Ser. No. 491,240
9 Claims. (Cl. 352—128)

ABSTRACT OF THE DISCLOSURE

In a move projector having a projection system, a housing, a pair of film runs positioned in the housing, and a driving sprocket positioned in the housing and disposed between the film runs for simultaneously driving the pair of film runs, the improvement comprising, in preferred form, a door for the housing, and guide means mounted to the door, the door being movable between a closed position whereat the guide means position and maintain the runs in operational engagement with the sprocket and an open position whereat the guide means are removed from operational engagement with the sprocket. This movie projector is particularly adapted for use by children because of its simple and easy threading characteristics.

---

This invention relates to move projectors and, more specifically, to a toy movie projector for children by means of which a child may project moving pictures onto a blank wall or screen.

The toy movie projector of this invention employs a film cartridge having a continuous reel of film. The film cartridge is provided with means to effect a snap-in relationship with the housing of the projector for ease of loading the film. Threading of the continuous film strip, normally a tedious operation in movie projectors, is promoted by a novel guide system associated with the drive means which affords automatic engagement of the film strip with the drive means. The movement of the continuous film strip is accomplished by hand operated crank means. As the film strip is continuous, the crank may be rotated in either the clockwise or counterclockwise direction, thus moving the movie scenes with either frontward or backward motion. The movie scenes are projected onto a suitable surface through use of a battery powered light bulb-lens projection system.

Therefore, it has been the primary objective of this invention to provide a toy movie projector of the type set forth for young children that is easy and simple to use.

It has been a further object of this invention to provide a toy movie projector having a film cartridge with which it is easy and simple to change films.

It has been an additional object of this invention to provide a toy movie projector having means whereby the partially threaded film may be automatically brought into operative engagement with the drive means of the projector, thereby alleviating the tedious nature of the threading operation and lending to the simplicity and ease of operation of the toy.

It has been a further object of this invention to provide a toy movie projector having instructional value for the education of children, while maintaining simplicity of operation for ease of comprehension.

An additional object of this invention has been to produce a toy movie projector having structural characteristics such that it will withstand the abuse and rough handling to which toys of this type are subjected in the normal course of play by children.

A further object of this invention has been to provide a toy movie projector made from molded plastic parts such that it is relatively economical to manufacture and relatively simple to assemble.

These and other objects and advantages of the present invention will be more readily apparent from the following detailed description of the drawings which illustrate a preferred embodiment of the invention.

In the drawings:

FIGURE 5 is a cross-sectional view taken along line 5—5 of FIGURE 3.

FIGURE 6 is a side perspective view of the film cartridge holder, that is depicted in cross section in FIGURE 5, and guide means associated therewith.

FIGURE 7 is a front view of the film guide means associated with the drive means when in a partially open position.

FIGURE 8 is a front view of the members depicted in FIGURE 7 wherein the members are in a closed or operational position and is a cross-sectional view taken along line 8—8 of FIGURE 3.

FIGURE 9 is a fragmentary cross-sectional view taken along line 9—9 of FIGURE 3.

FIGURE 10 is a partially cut-away front view of the base of the housing depicted in FIGURE 1 showing the hinge that allows the door to be opened from the housing while the housing rests on a surface.

Figure 4:
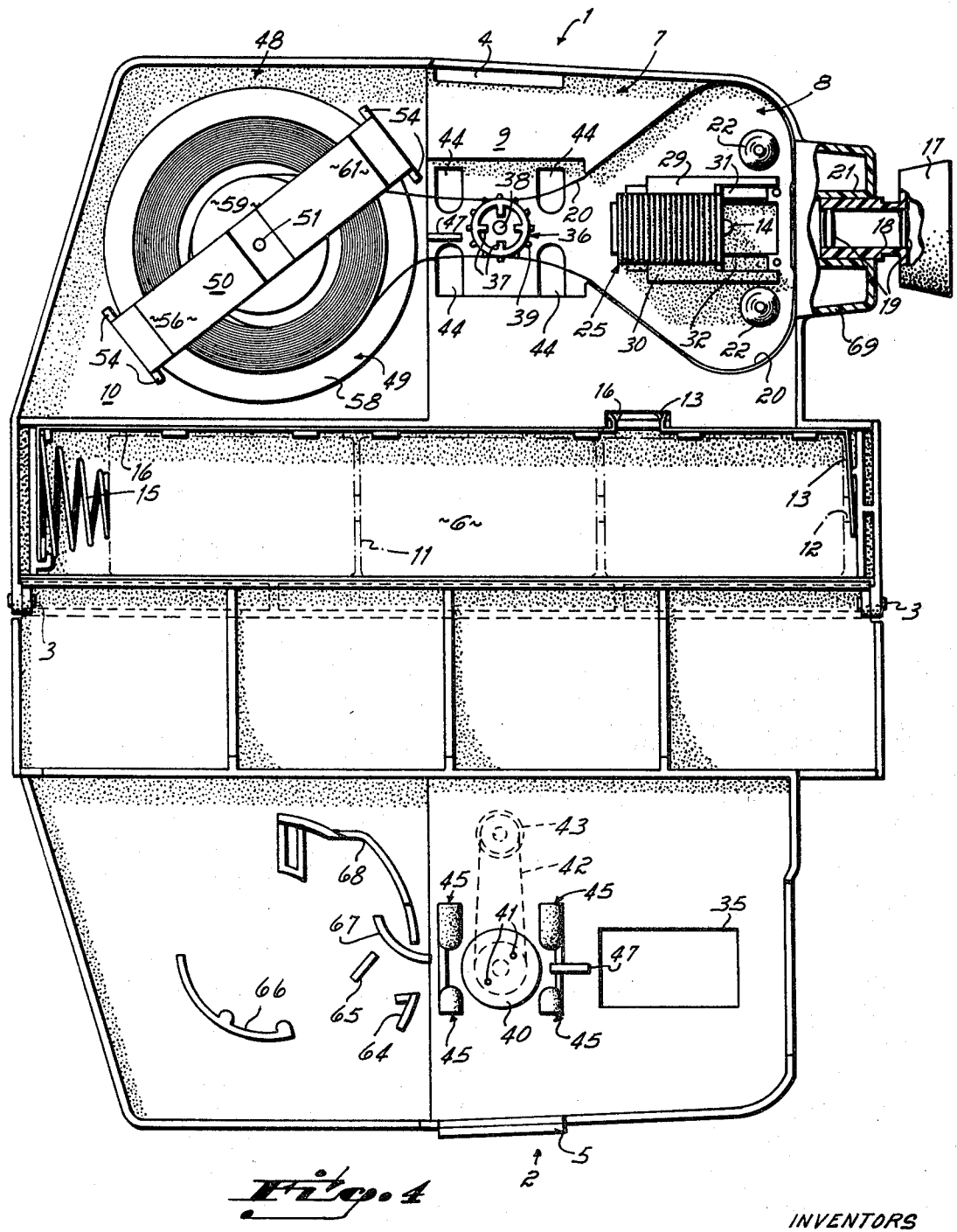
FIGURE 4 is a top view of the toy movie projector when in the open or film loading position.

As can be seen from FIGURE 4, a preferred embodiment of the toy movie projector has a housing having a main body 1 with a door 2 hingedly attached thereto by pins 3. The main body 1 and door 2 are maintained in the closed position by means of a snap-fit at the top of the housing. The snap-fit relationship is caused by an aperture 4 in the main body 1 receiving a projection 5 integrally related to the door 2, and having a raised portion on the end thereof. The housing may be divided into a lower chamber 6, and an upper chamber 7 having a front section 8, a middle section 9 and a rear section 10.

The lower chamber 6 is used for the retention of three batteries 11, the batteries 11 being the energy source for the movie projector light. The central terminal 12 of the forwardmost battery is contacted by one end of a metallic strip 13, the other end of which is in contact with the sides of a light bulb 14 in the front section 8 of the upper chamber 7. To ensure that the batteries remain in intimate contact in the lower chamber 6, a helical spring 15 urges the rearmost battery forward. Connected with the spring 15 is a secono metallic strip 16 which terminates just to the rear of the light bulb 14. Thus, the electrical circuit comprising the batteries 11, the two metallic strips 13, 16 and the light bulb 14 may be completed by a switch means to be subsequently discussed, thus energizing the light bulb 14.

The front section 8 of the upper chamber 7 contains the projection system of the movie projector, i.e., the lens system and light source. The lens system has a cup 17 with outwardly flaring sides fixedly mounted on the end of a tube 18, the cup 17 having an aperture in its base roughly equivalent in diameter to the internal diameter of the tube 18. Within the tube 18 is fixedly positioned a pair of lenses 19 in such a manner as to be able to project an image from the film strip 20 onto a wall, screen or other convenient surface. The tube 18 is slidably engaged with a substantially cylindrical mounting 21 for focusing the image so projected. The mounting 21 is rigidly held to the main body 1 by means of a holder 69.

Figure 1:
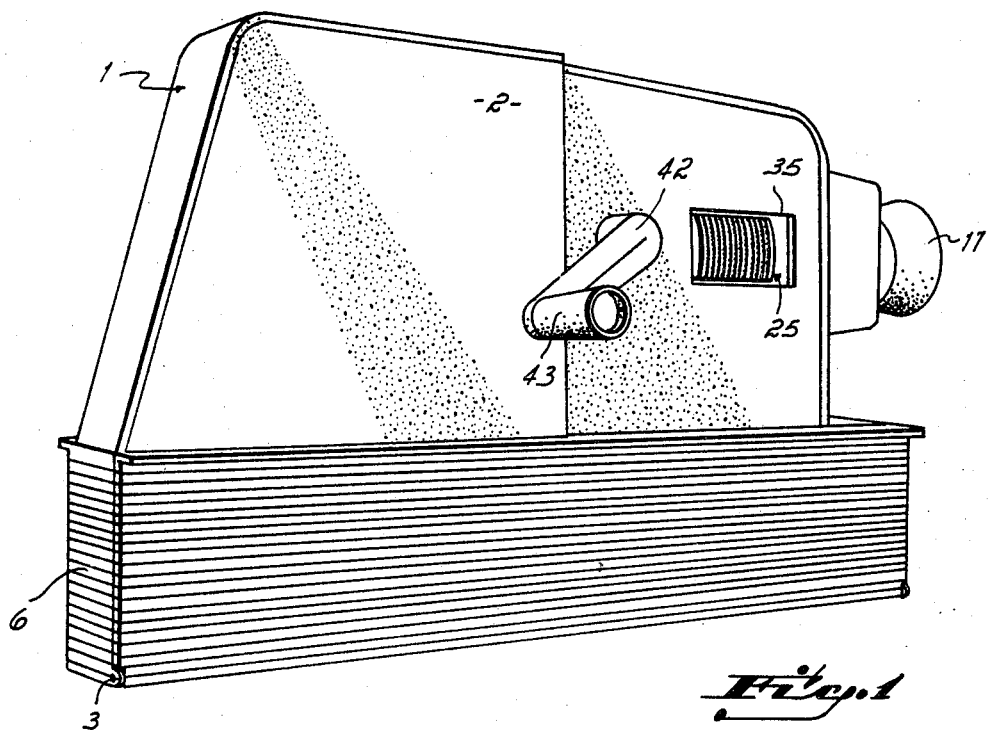
FIGURE 1 is a side perspective view of a toy movie projector constructed in accordance with the principles of this invention.
Figure 2:
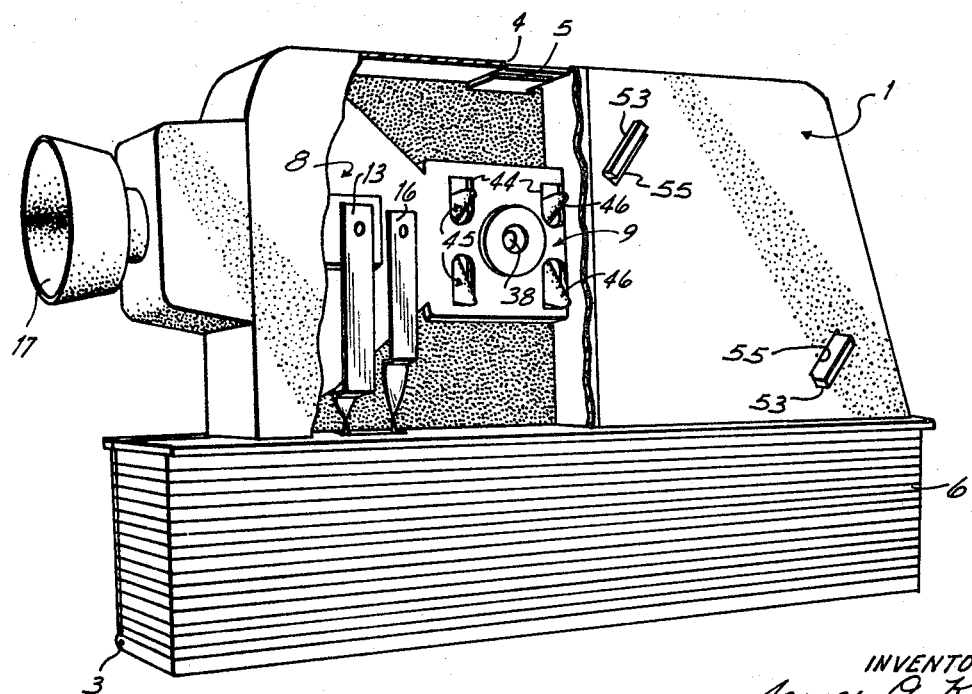
FIGURE 2 is a partially cut-away side perspective view of the side opposite that depicted in FIGURE 1.
Figure 3:
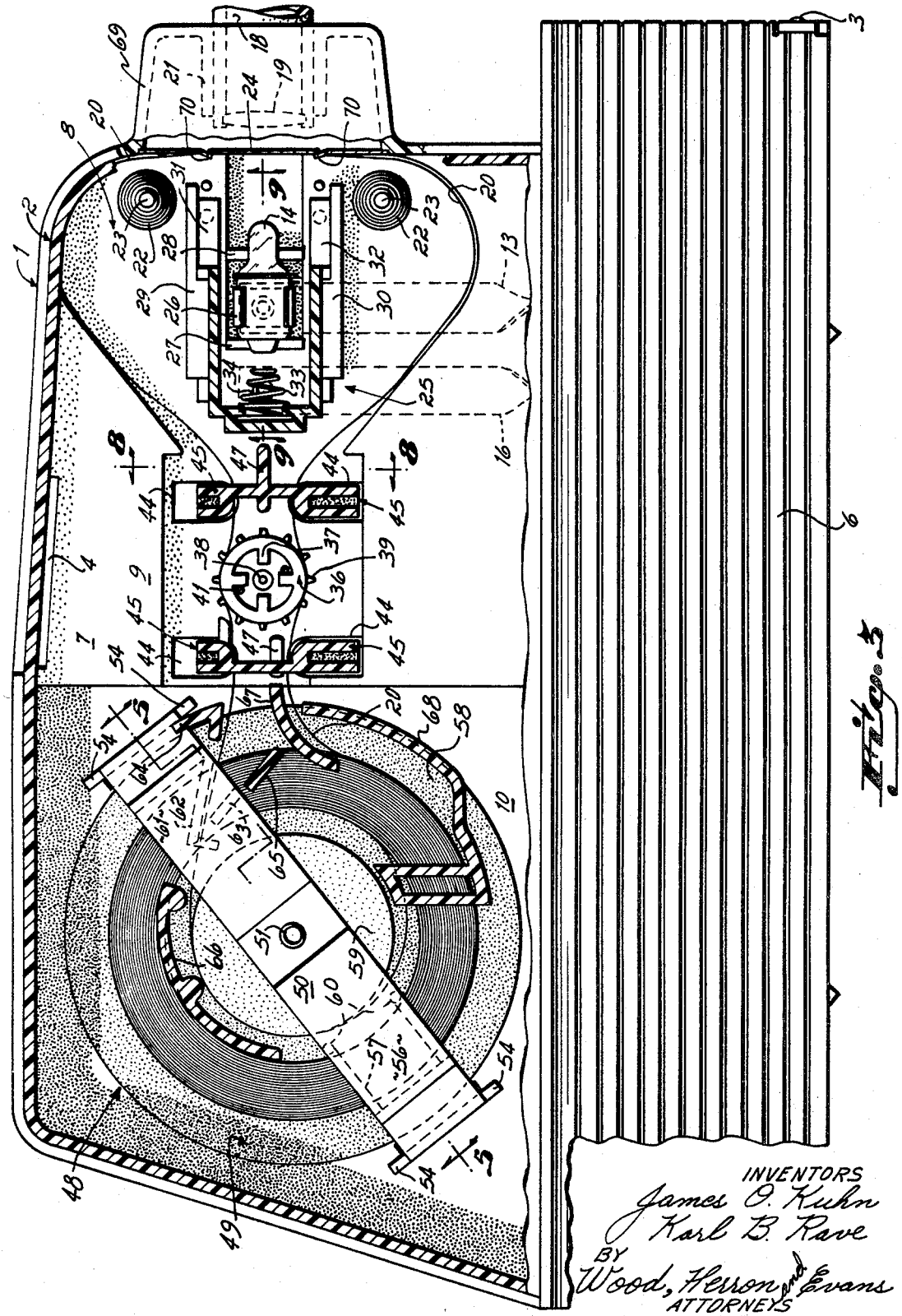
FIGURE 3 is an enlarged partially cut-away side elevational view of the side depicted in FIGURE 1.

The film strip 20 is held axially stationary as it moves past the lens system by means of conical springs 22 mounted on pins 23 integral with the main body 1. The conical spring 22 is mounted at its apex to the pins 23 with its base being free, i.e., not secured to the main body 1, and thus exercises a spring effect on the film strip 20 as it is moved along the wall 24 of the main body 1. Of course, the wall 24 has an aperture therein the size of one frame on the film strip 20 and is in direct axial alignment with the lens system and the light source for suitable projection of the images on the film. Integrally related to the wall 24 are detents 70 which are best seen in FIG. 3. The detents 70 cooperate with the conical springs 22 to provide the film strip 20 with an intermittent motion as it passes the aperture in the wall 24. Thus, each frame on the film strip resides for a finite period in the back of the aperture before a subsequent frame is projected onto the viewing surface.

The light source has a light bulb 14 which draws energy from the batteries 11 by means of the metallic strips 13, 16 when activated by the switch 25. The light bulb 14 is held by means of a clip 26 (see FIGS. 3 and 9) which is directly attached to one end of the metallic strip 13. The front and rear of the bulb 14 rest in holders 27, 28 which are integrally attached to the main body 1, to ensure centering of the light bulb 14 with reference to the aperture in wall 24 and the lenses 19. Adjacent and to each side of the holders 27, 28 are channels 29, 30 which are integrally connected with the main body 1 and adapted to receive the feet 31, 32 integrally attached to the switch 25. The switch 25, on the inner and rear end thereof has a conical spring 33 fixedly attached thereto. When the door 2 is in operative engagement with the main body 1 the switch 25 protrudes through an aperture 35 in the door 2 so that it may be manually activated. Upon forward motion of the switch 25, which forward motion is directed by the feet 31, 32 being slidably engaged with the channels 29, 30, the conical spring 33 contacts the rearward end of the light bulb 14 while simultaneously contacting a rivet 34 by means of which the metallic strip 16 is held to the main body 1. Thus, the electrical circuit is completed and the light bulb 14 energized for projection of an image fro mthe film strip 20, through the aperture in the wall 24 and the lenses 19, and onto the viewing surface.

The middle section 9 of the upper chamber 7 houses the drive means for moving the continuous film strip 20 past the aperture in the wall 24 and means for automatically positioning the film strip 20 onto the drive means as the door 2 of the main body 1 is closed, thus making the movie projector ready for operation. The drive means includes a sprocket wheel 36, substantially cylindrical in shape with one end closed. which is partitioned into four compartments by walls 37. The sprocket wheel 36, at the closed end thereof, is rotatably mounted to the main body 1 by means of a rivet 38, the other end having sprocket teeth 39 spaced circumferentially around the sprocket wheel at distances equivalent to the perforations in the film strip 20. On the inside of the door 2 is rotatably mounted a circular plate 40 having two pins 41 integrally and oppositely mounted thereon. The plate 40 is mounted in such a position that upon closure of the door 2 the pins 41 will operatively engage two of the four walls 37 of the sprocket wheel 36. Integrally mounted with the plate 40, but being on the outside of the door 2, is a crank 42 having a handle 43. By means of the crank, the plate 40, the pins 41 and consequently the sprocket wheel 36 may be rotated in either a clockwise or counterclockwise direction, the direction being dependent upon the direction of rotation of the crank 42, thus causing the images projected on the viewing surface to be seen with either a forward or backward motion.

To maintain the continuous film strip 20 in operative engagement with the sprocket wheel 36 and sprocket teeth 39, and to automatically guide the upper and lower run of the film strip 20 into operative engagement when the door 2 is closed, guide means are provided to guide the runs of the film strip 20 into position and keep them there during operation of the toy projector. As best shown in FIGURES 3, 4, 7 and 8, at each side of the sprocket wheel 36, in the main body 1, is a pair of apertures 44. In a similar geometric position on the inside of the door 2 are projections 45 having tapered ends 46, the tapered ends 46 being such as to automatically guide and keep the runs of the film strip 20 in operative engagement with the sprocket teeth 39 of the sprocket wheel 36 upon closure of the door 2 with respect to the main body 1. The walls 47 serve to further maintain engagement of the film strip 20 with the sprocket wheel 36 by preventing fouling of the film strip 20 as it enters or leaves the drive means.

The rear section 10 of the upper chamber 7 houses the continuous film cartridge 48 from which the upper and lower runs of the film strip 20 emanate and to which they return. As best shown in FIGURES 3, 5, and 6, the continuous film roll is loosely affixed to a rotatable hat-shaped holder 49. The hat-shaped holder 49 is rotatably engaged with a clamp 50 by means of a rivet 51. This combination, by means of legs 52, feet 53 and stops 54 on the clamp 50, is fixedly engaged with the man body 1 through apertures 55 in a snap-fit relationship. Thus, the hat-shaped holder 49 does not touch the main body 1 but is free to rotate, it being rotatably affixed to the clamp 50.

The clamp 50 and the door 2 have associated with them guide means for guiding the film strip 20 on and off the continuous film roll. The clamp 50 is angularly placed, with reference to a central axis of the projector, and especially formed for just such a purpose. The rearward end 56 of the clamp 50 has guides 57 for maintaining the film cartridge in a substantially flat position on the brim 58 of the hat-shaped holder 49. To maintain the film roll in a substantially rolled up position, the leg 52 at the rearward end 56 of the clamp 50 cooperates with the projection 60 from the guide 57. The leg 52 at the forward end 61 of the clamp 50 is also shaped so as to cooperate in performing this function. In addition, to prevent binding, the projection 60 serves to keep the inner circumference of the film roll from the crown 59 of the hat-shaped holder 49 at the approximate point where the upper run of the film strip 20 separates from the continuous film roll. The forward end 61 of the clamp 50 has guides 62, 63, for guiding the upper run of the film strip 20 out of the rear section 10 and into the middle section 9 of the upper chamber 7 or vice versa, the direction being dependent on the relative movement of the film strip 20.

The inside of the door 2 also has guide means for guiding the film strip 20 into and out of the rear section 10 and on and off the continuous film roll so that congestion and foul up of the film strip is prevented during the transition from the film roll and, hence, the film cartridge 49, to the drive means. The guides 64, 65, 66, 67 are integrally connected to the door 2 and are shaped so as to perform the aforementioned purpose for the upper run of the film strip 20. The guides 67, 68 are integrally connected to the door 2 and perform the same purpose for the lower run of the film strip 20. The guides 67, 68 are also shaped and positioned so as to help maintain the continuous film roll in a substantially flat position on the brim 58 of the hat-shaped holder 49.

For operation of the toy movie projector, the door 2 is opened with reference to the main body 1, as is shown in FIGURE 4. The continuous film roll, in combination with hat-shaped holder 49 and the guide means associated therewith, i.e., the film cartridge 48, is snapped into position with the main body 1 by means of apertures 55 and feet 53 on the clamp 50. A loop of film, having upper and lower runs, is then withdrawn from the film roll which is sufficient to loosely engage the sprocket wheel 36. Also, the loop of film must be sufficient to pass around the conical spring 22 such that it rests against the wall 24 and the detents 70 engage the perforations in the film strip 20. Subsequently, the door 2 is closed and the projections 45 thereon, by means of the tapered ends 46, automatically guide the upper and lower runs of the film strip 20 into operative engagement with the sprocket wheel 36 and the sprocket teeth 39. In addition, the projections 45 serve to maintain the film strip 20 in operative engagement with the drive means during operation of the toy projector. The light is actuated by moving the switch 25 frontwards and the picture image forcused by adjusting the slidable lens system. The crank 42 is then turned with either a clockwise or counterclockwise rotation, the direction of rotation being dependent upon the desires of the operator to view a movie with either forward or reverse action in the movie scenes.

Having described and set forth our invention, what we desire to claim and protect by Letters Patent is:

1. In a movie projector having a projection system, a housing, a door associated with said housing, a pair of film runs positioned in said housing, and a driving sprocket mounted to said housing and disposed between said film runs for simultaneously driving said pair of film runs, the improvement in drive means for said sprocket comprising a crank rotatably mounted on the outside of said door, and at least one prong integral with said crank and rotatably mounted on the inside of said door whereby upon rotation of said prong a circle is defined thereby such that, upon complete closure of said door, said prong contacts said sprocket in a manner allowing said sprocket to be rotated either clockwise or counterclockwise upon the turning of said crank in the appropriate direction.

2. A toy movie projector as set forth in claim 1 having a sprocket with at least one receptacle therein for reception of at least one prong.

3. In a movie projector having a projection system, a housing, and a continuous film cartridge with a first and a second film run extending in a loop therefrom, the improvement comprising means for mounting said continuous film cartridge in said housing comprising film holder means, bracket means, and means rotatably mounting said holder means on said bracket means, said bracket means adapted to be attached to said housing in snap-in relation.

4. A movie projector as set forth in claim 3 wherein said bracket means has second guide means associated therewith.

5. A movie projector as set forth in claim 4 having adidtional guide means mounted on a door of said housing for purposes of guiding said first and second runs between said continuous film cartridge and a drive sprocket.

6. In a movie projector having a projection system, a housing, a pair of film runs positioned in said housing, and a driving sprocket positioned in said housing and disposed between said film runs for simultaneously driving said pair of film runs, the improvement comprising a door for said housing, and guide means mounted to said door, said door being movable between a closed position whereat said guide means position and maintain said runs in operational engagement with said sprocket and an open position whereat said guide means are removed from operational engagement with said sprocket.

7. In a movie projector according to claim 6 wherein said guide means carry angulated faces for camming said film runs into operational contact with said sprocket upon the closing of said door.

8. In a movie projector according to claim 7 including apertured structure associated with said housing for receiving said guide means in the closed position.

9. In a movie projector according to claim 7 wherein said guide means comprise at least two projections.

References Cited
UNITED STATES PATENTS

| | | | |
|---|---|---|---|
| 2,327,776 | 8/1943 | Fairbanks et al. | 352—159 |
| 2,605,674 | 8/1952 | Bouma | 352—128 |
| 3,264,051 | 8/1966 | Melton | 352—129 |

JULIA E. COINER, *Primary Examiner.*